(12) United States Patent
Matsushita et al.

(10) Patent No.: US 12,191,682 B2
(45) Date of Patent: Jan. 7, 2025

(54) POWER FEEDING STATION

(71) Applicant: OMRON Corporation, Kyoto (JP)

(72) Inventors: Katsumi Matsushita, Kyoto (JP); Hiroyuki Mino, Kyoto (JP); Atsushi Nomura, Kyoto (JP); Kenichi Tabata, Kyoto (JP); Daiki Ando, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 0 days.

(21) Appl. No.: 18/048,868

(22) Filed: Oct. 24, 2022

(65) Prior Publication Data

US 2023/0147563 A1    May 11, 2023

(30) Foreign Application Priority Data

Nov. 11, 2021   (JP) .................................. 2021-184261

(51) Int. Cl.
| | | |
|---|---|---|
| *H02J 50/90* | (2016.01) | |
| *B60L 53/12* | (2019.01) | |
| *B60L 53/31* | (2019.01) | |
| *B60L 53/66* | (2019.01) | |
| *H02J 50/10* | (2016.01) | |
| *H02J 50/80* | (2016.01) | |

(52) U.S. Cl.
CPC ............. *H02J 50/90* (2016.02); *B60L 53/12* (2019.02); *B60L 53/31* (2019.02); *B60L 53/66* (2019.02); *H02J 50/10* (2016.02); *H02J 50/80* (2016.02)

(58) Field of Classification Search
None
See application file for complete search history.

(56) References Cited

U.S. PATENT DOCUMENTS

| | | | | |
|---|---|---|---|---|
| 2010/0315038 | A1* | 12/2010 | Terao ...................... | H02J 50/12 320/108 |
| 2014/0145515 | A1* | 5/2014 | Jung ........................ | H02J 50/12 307/104 |
| 2015/0051750 | A1* | 2/2015 | Kurs ....................... | G05F 1/625 700/298 |
| 2016/0094043 | A1* | 3/2016 | Hao ......................... | H04B 5/26 307/104 |

(Continued)

FOREIGN PATENT DOCUMENTS

| | | |
|---|---|---|
| WO | 2016/147295 A1 | 9/2016 |
| WO | 2017/150713 A1 | 9/2017 |

*Primary Examiner* — Daniel Kessie
(74) *Attorney, Agent, or Firm* — METROLEX IP LAW GROUP, PLLC; Robert L. Scott, Esq.

(57) ABSTRACT

A power feeding station according to one or more embodiments may include a feeder including a feeder coil that feeds power to a receiver in an electric mobility vehicle, a power supply circuit that supplies AC power to the feeder coil, and a control circuit that controls a frequency and a voltage of the AC power. The control circuit provides, through a notification source a notification of guidance about a stop position of the electric mobility vehicle relative to a housing to increase power transmission efficiency from the feeder to the receiver in accordance with the frequency of the AC power supplied to the feeder coil with which the receiver outputs a constant voltage or in accordance with the voltage of the AC power supplied to the feeder coil with which the receiver outputs a constant and predetermined voltage.

5 Claims, 10 Drawing Sheets

(56) References Cited

U.S. PATENT DOCUMENTS

| | | | |
|---|---|---|---|
| 2016/0114781 A1* | 4/2016 | Fink | B60L 53/12 |
| | | | 903/907 |
| 2017/0025900 A1* | 1/2017 | Amari | H02J 50/12 |
| 2017/0194817 A1* | 7/2017 | Takatsu | B60L 53/126 |
| 2017/0250574 A1* | 8/2017 | Min | H02J 50/12 |
| 2018/0339599 A1* | 11/2018 | Iwamoto | B60L 53/126 |
| 2019/0199135 A1* | 6/2019 | Nagaoka | H02J 50/12 |
| 2019/0312468 A1* | 10/2019 | Kwon | H02J 50/60 |
| 2021/0075271 A1* | 3/2021 | Van Wageningen | H02J 50/12 |

* cited by examiner

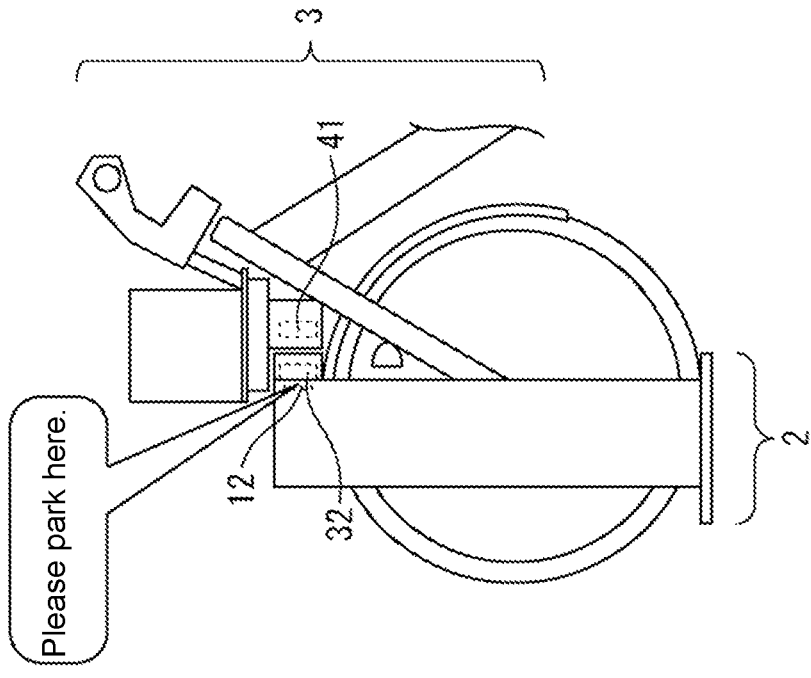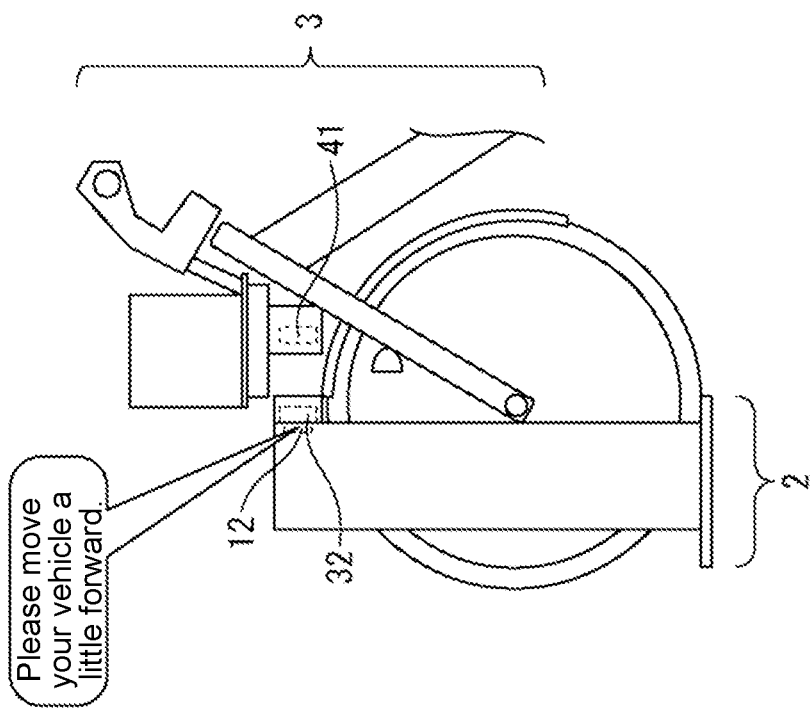

POWER FEEDING STATION

CROSS-REFERENCE TO RELATED APPLICATION

This application claims priority to Japanese Patent Application No. 2021-184261 filed on Nov. 11, 2021, the contents of which are incorporated herein by reference.

FIELD

The present disclosure relates to a power feeding station that feeds power contactlessly to an electric mobility vehicle.

BACKGROUND

Equipment has been developed for feeding power contactlessly to a two-wheeler to drive a motor that provides auxiliary power in the two-wheeler (refer to Patent Literatures 1 and 2).

Patent Literature 1 describes a power feeding stand including a power feeder circuit to feed power to a bicycle including a power receiver circuit. A wireless power feeding system described in Patent Literature 2 includes a transmitter and an electric bicycle including a receiver that receives and charges power wirelessly transmitted from the transmitter and uses the charged power for electric assistance.

CITATION LIST

Patent Literature

Patent Literature 1: WO 2017/150713
Patent Literature 2: WO 2016/147295

SUMMARY

An example contactless power feeding system includes a device for feeding power including a coil, and a device for receiving power including another coil. The device for feeding power (hereafter referred to as a feeder) supplies alternating current (AC) power to the coil for feeding power (hereafter referred to as a feeder coil). The feeder coil thus generates a magnetic field. The coil for receiving power (hereafter referred to as a receiver coil) in the device for receiving power (hereafter referred to as a receiver) resonates with the magnetic field to allow contactless power feeding from the feeder to the receiver.

A contactless power feeding system may transmit power independently of slight changes in the positional relationship between the feeder coil in the power feeder and the receiver coil in the power receiver. However, the power transmission efficiency may be changed by the positional relationship between the feeder coil and the receiver coil. To increase the power transmission efficiency, a user of a two-wheeler may receive guidance about the stop position of the two-wheeler.

One or more embodiments are directed to a power feeding station that feeds power contactlessly to an electric mobility vehicle through a feeder coil and provides guidance about the stop position of the electric mobility vehicle to increase power transmission efficiency.

A power feeding station according to one or more embodiments feeds power to a receiver including a receiver coil included in an electric mobility vehicle. The power feeding station includes a feeder that feeds power to the electric mobility vehicle through the receiver coil, and a housing accommodating the feeder. The feeder includes a feeder coil that feeds power to the receiver through the receiver coil, a power supply circuit that supplies alternating current power to the feeder coil, and a control circuit that controls a frequency and a voltage of the alternating current power supplied to the feeder coil. The control circuit provides, through a notification source included in the power feeding station or in the electric mobility vehicle, a notification of guidance about a stop position of the electric mobility vehicle relative to a housing to increase power transmission efficiency from the feeder to the receiver in accordance with the frequency of the alternating current power supplied to the feeder coil with which the receiver outputs a constant voltage or in accordance with the voltage of the alternating current power supplied to the feeder coil with which the receiver outputs a constant and predetermined voltage. The power feeding station with the above structure feeds power contactlessly to the electric mobility vehicle through the feeder coil and reduces the likelihood that foreign objects enter between the receiver coil included in the electric mobility vehicle and the feeder coil.

In the above power feeding station, the control circuit may provide, through the notification source, the notification of guidance about the stop position of the electric mobility vehicle to allow the feeder coil and the receiver coil to be nearer each other when the alternating current power supplied to the feeder coil with which the receiver outputs a constant voltage has a frequency lower than a predetermined frequency threshold. The power feeding station with the above structure may guide the electric mobility vehicle to the stop position at which higher power transmission efficiency may be achieved.

In the above power feeding station, the control circuit may provide, through the notification source, the notification of guidance about the stop position of the electric mobility vehicle to allow the feeder coil and the receiver coil to be nearer each other when the alternating current power supplied to the feeder coil with which the receiver outputs a constant and predetermined voltage has a higher voltage than a predetermined voltage threshold. The power feeding station with the above structure may guide the electric mobility vehicle to the stop position at which higher power transmission efficiency may be achieved.

In the power feeding station according to one or more embodiments, the control circuit may record a temporal change in the frequency of the alternating current power supplied to the feeder coil with which the receiver outputs a constant voltage, determine, in accordance with the temporal change in the frequency, a direction in which the electric mobility vehicle is to be moved relative to the housing to increase power transmission efficiency from the feeder to the receiver, and provide, through the notification source, a notification to move the electric mobility vehicle in the direction. The power feeding station with the above structure determines the direction in which the electric mobility vehicle is to be moved toward the stop position at which higher power transmission efficiency may be achieved and guides the electric mobility vehicle in the determined direction.

In the power feeding station according to one or more embodiments, the control circuit may record a temporal change in the voltage of the alternating current power supplied to the feeder coil with which the receiver outputs a constant and predetermined voltage, determine, in accordance with the temporal change in the voltage, a direction in which the electric mobility vehicle is to be moved relative to the housing to increase power transmission efficiency from the feeder to the receiver, and provide, through the notification source, a notification to move the electric mobility vehicle in the direction. The power feeding station with the above structure determines the direction in which the electric mobility vehicle is to be moved toward the stop position at which higher power transmission efficiency may be achieved and guides the electric mobility vehicle in the determined direction.

BRIEF DESCRIPTION OF THE DRAWINGS

FIGS. 11A and 11B are diagrams each illustrating an example positional relationship between a feeder coil in a power feeding station and a receiver coil in a two-wheeler and an example message appearing on a display in a positional relationship.

DETAILED DESCRIPTION

A power feeding station according to one or more embodiments will now be described with reference to the drawings. The power feeding station includes a feeder for supplying power to a two-wheeler in a housing to transmit power to the two-wheeler through a feeder coil in the feeder and a receiver coil in a receiver included in the two-wheeler being parked. The frequency of alternating current (AC) power supplied to the feeder coil is set to a predetermined frequency corresponding to the degree of coupling between the feeder coil and the receiver coil. The feeder in the power feeding station and the receiver in the two-wheeler can thus perform a constant voltage output operation in which the receiver outputs a constant voltage independently of the resistance of a load connected to the receiver. The power feeding station identifies the frequency of AC power supplied to the feeder coil that allows the feeder and the receiver to perform a constant voltage output operation, and provides, based on the identified frequency, a notification to guide the two-wheeler to a position at which higher power transmission efficiency is achieved.

Figure 1:
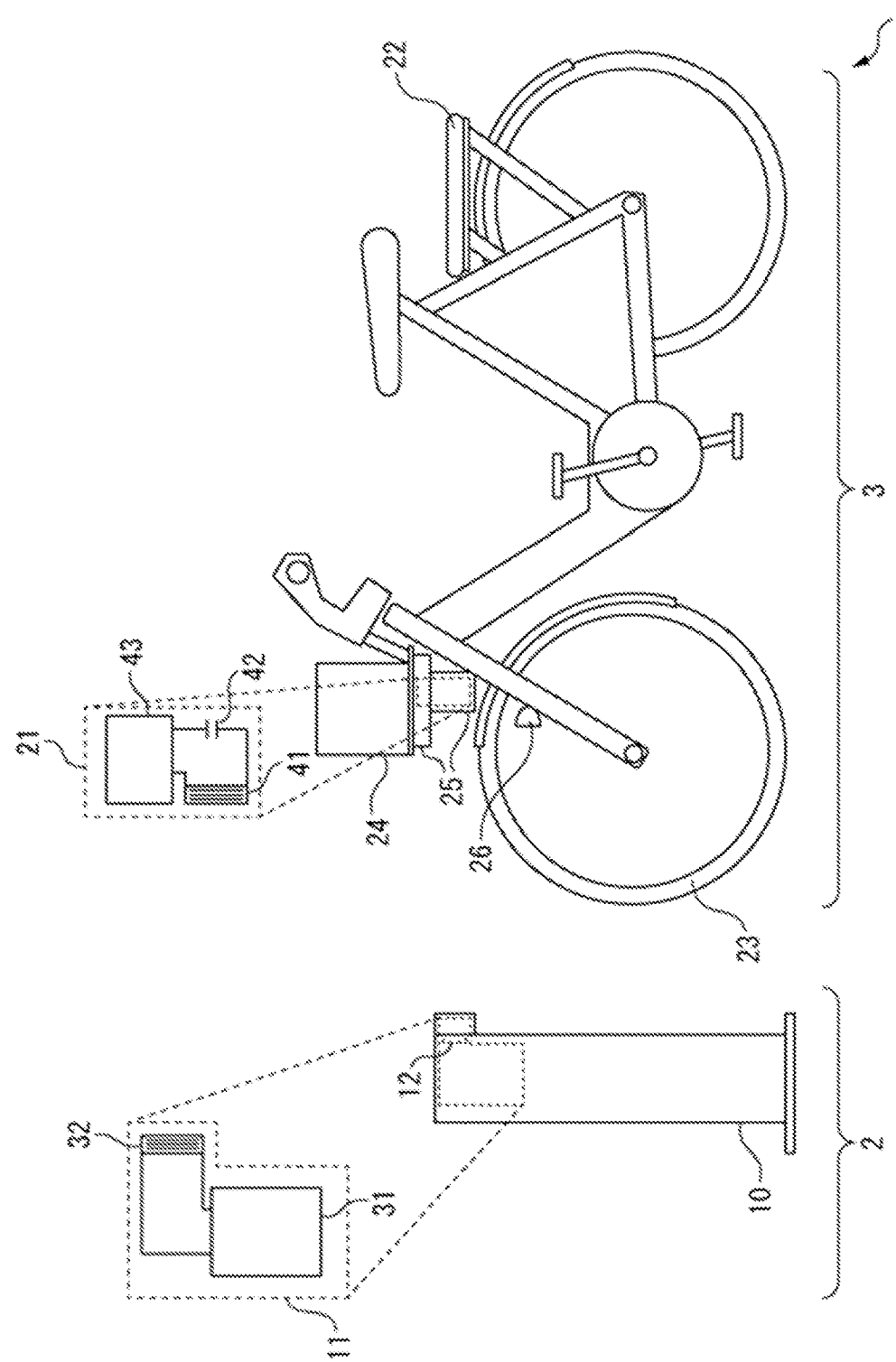
FIG. 1 is a schematic diagram illustrating a contactless power feeding system including a power feeding station and a two-wheeler according to an embodiment or embodiments.

FIG. 1 is a schematic diagram of a contactless power feeding system including a power feeding station and a two-wheeler according to the present embodiment.

As shown in FIG. 1, the contactless power feeding system 1 includes a power feeding station 2 and a two-wheeler 3. The power feeding station 2 can feed power to the two-wheeler 3. The power feeding station 2 includes a housing 10, a feeder 11, and a display 12. The feeder 11 includes a feeder coil 32 in the housing 10.

The two-wheeler 3 is an example of an electric mobility vehicle. The two-wheeler 3 includes a receiver 21 including a receiver coil 41, and a battery 22 for storing power received by the receiver 21. The two-wheeler 3 includes a front basket 24 above its front wheel 23, and a box 25 attached to the bottom surface of the front basket 24. The box 25 is formed from an insulating material such as a resin. The box 25 accommodates the receiver 21. The receiver coil 41 in the receiver 21 between the front wheel 23 and the front basket 24 of the two-wheeler 3 is attached to the two-wheeler 3 with its winding axis extending ahead of the two-wheeler 3. The battery 22 is installed on a rack located above the rear wheel of the two-wheeler 3 and is charged with power received through the receiver 21. The power charged in the battery 22 is used to drive a motor (not shown) that provides auxiliary power for the two-wheeler 3 or is used to turn on a headlight 26. When the parked two-wheeler 3 satisfies a predetermined positional relationship with the power feeding station 2, the feeder coil 32 in the feeder 11 feeds power contactlessly to the receiver coil 41 in the receiver 21.

Figure 2:
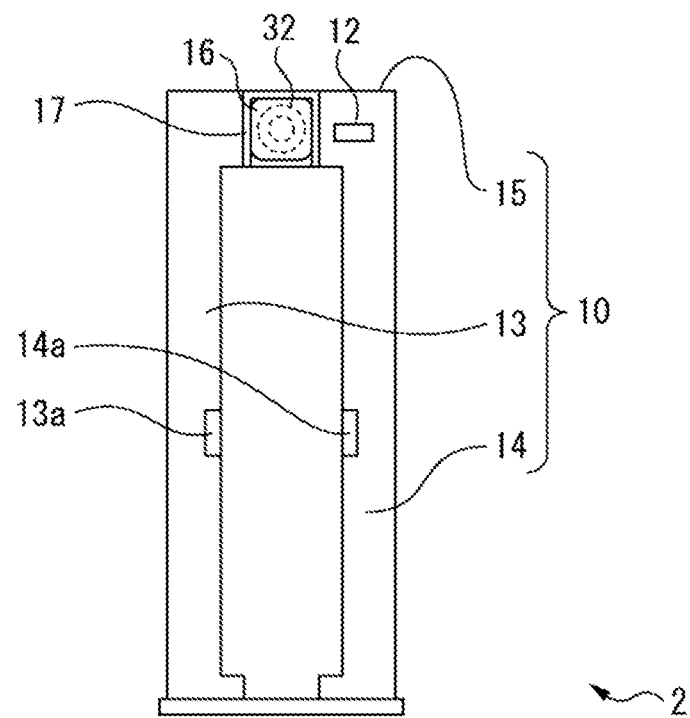
FIG. 2 is a diagram illustrating a schematic front view of a power feeding station as viewed from a two-wheeler to be parked.
Figure 3:
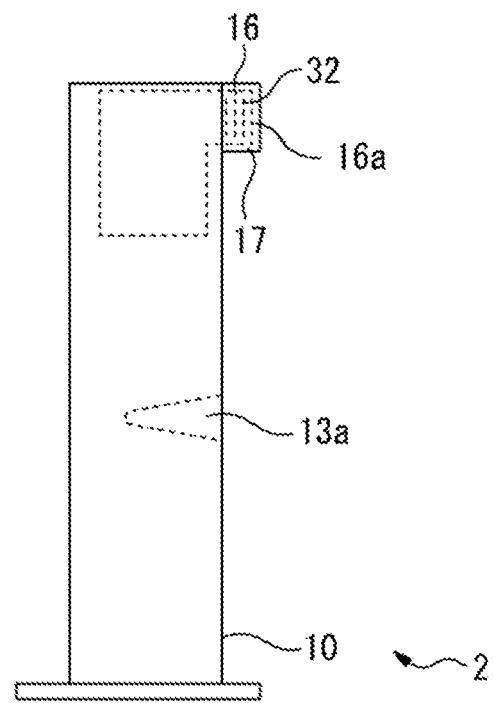
FIG. 3 is a diagram illustrating a schematic side view of a power feeding station.
Figure 4:
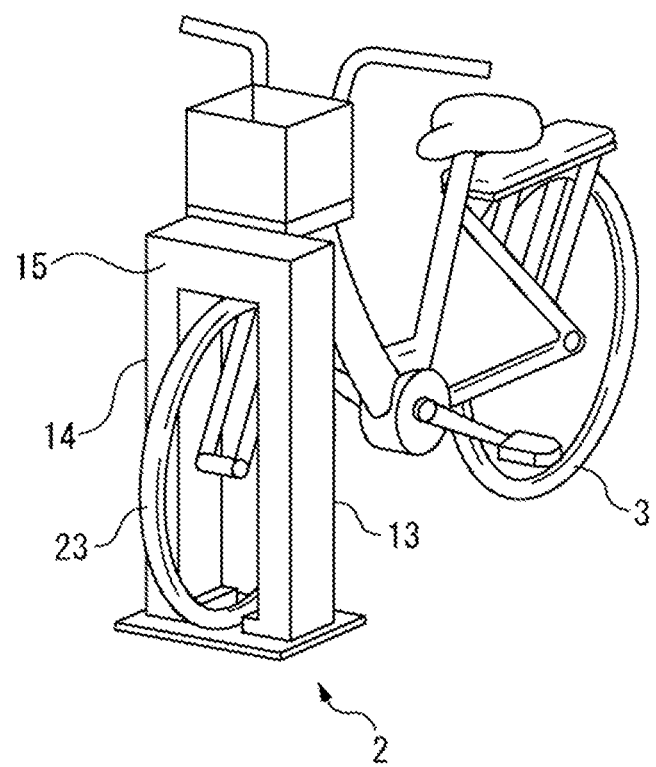
FIG. 4 is a diagram illustrating a schematic perspective view of a power feeding station with a two-wheeler parked at the power feeding station.
Figure 5:
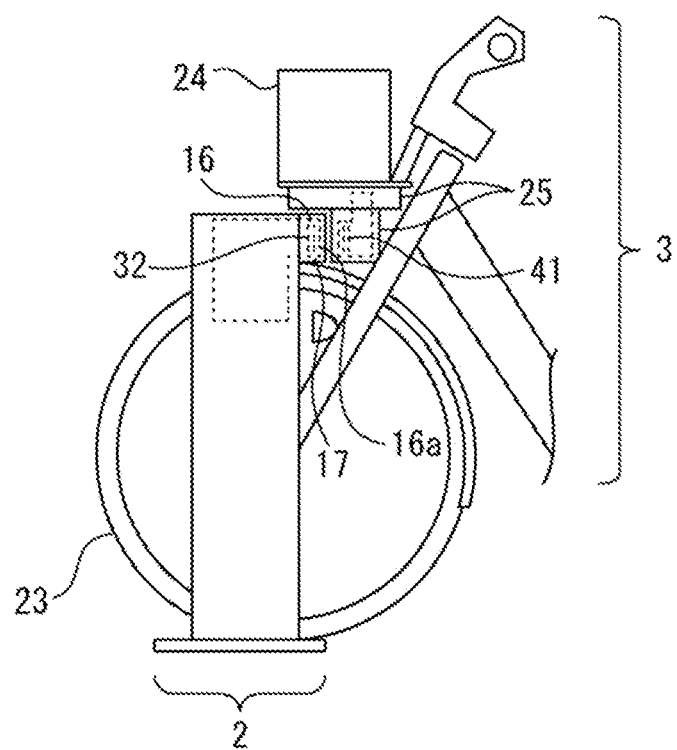
FIG. 5 is a diagram illustrating a partially enlarged view of a power feeding station and a two-wheeler describing power feeding from the power feeding station to the two-wheeler.

FIG. 2 is a schematic front view of the power feeding station 2 as viewed from the two-wheeler 3 to be parked. FIG. 3 is a schematic side view of the power feeding station 2. FIG. 4 is a schematic perspective view of the power feeding station 2 with the two-wheeler 3 parked at the power feeding station 2. FIG. 5 is a partially enlarged view of the power feeding station 2 and the two-wheeler 3 describing power feeding from the power feeding station 2 to the two-wheeler 3 parked at the power feeding station 2. A surface of the housing 10 facing the two-wheeler 3 parked at the power feeding station 2 may hereafter be referred to as a front surface of the housing 10.

The housing 10 in the power feeding station 2 defines a predetermined parking position for the two-wheeler 3. In the present embodiment, as shown in FIGS. 2 to 4, the front surface of the housing 10 has an inverted U shape as a whole. The housing 10 includes two substantially quadrangular prism-shaped pillars 13 and 14, which extend substantially vertically to a road surface on which the power feeding station 2 is installed, and an upper end 15 connecting upper portions of the two pillars 13 and 14. When the two-wheeler 3 is parked at the power feeding station 2, the front wheel of the two-wheeler 3 is placed in a space between the two pillars 13 and 14 of the housing 10. More specifically, the space between the two pillars 13 and 14 corresponds to the position of the front wheel of the two-wheeler 3 to be parked.

Each of the pillars 13 and 14 and the upper end 15 is hollow and is formed from a metal such as aluminum or stainless steel, a resin, or a combination of these materials. One of the pillars 13 or 14 internally accommodates a power cable (not shown) for transmitting power from a utility or direct current (DC) power source to the feeder 11. A board (not shown) is attached inside the pillar 13, the pillar 14, or the upper end 15. A power supply circuit in the feeder 11 is located on the board. The pillar 13 may have a groove 13a on its surface facing the pillar 14. The pillar 14 may have a groove 14a on its surface facing the pillar 13. The grooves 13a and 14a may be engageable with the hub shaft of the front wheel of the two-wheeler 3 when the two-wheeler 3 is parked. Each of the grooves 13a and 14a may be gradually narrower from its portion near the front surface to its portion near a surface opposite to the front surface (hereafter referred to as a back surface).

To allow the receiver coil 41 in the receiver 21 in the two-wheeler 3 parked at the power feeding station 2 to face the feeder coil 32 in the feeder 11, the upper end 15 of the housing 10 includes, on its front surface, a substantially rectangular compartment 16 protruding toward the parked two-wheeler 3. The compartment 16 internally accommodates the feeder coil 32. The feeder coil 32 is installed with its winding axis orthogonal to a surface 16a at the front (hereafter also referred to as a front surface) of the compartment 16. The compartment 16 is formed from an insulating material, such as a resin, to avoid being affected by power fed from the feeder 11 to the receiver 21.

The compartment 16 may have a cover 17 protruding further toward the two-wheeler 3 than the front surface 16a of the compartment 16. The cover 17 may surround at least a part of the outer periphery of the compartment 16 including its upper end.

The upper end 15 includes the display 12 on its front surface. The display 12 is located lateral to the compartment 16. The display 12 is an example of a notification source and may be, for example, a liquid crystal display or an organic electroluminescent (EL) display. The display 12 displays a message for guidance about the parking position (or stop position) of the two-wheeler 3 received from the feeder 11. The position of the display 12 is not limited to the present example. The display 12 may be located on the top surface of the upper end 15.

The feeder 11 and the receiver 21 will now be described in detail.

In the present embodiment, the feeder 11 and the receiver 21 are included in a contactless power feeding apparatus that uses no resonance in the power feeder but uses a series resonance between the receiver coil 41 and the resonant capacitor 42 in the power receiver (an NS configuration). The feeder 11 and the receiver 21 are not limited to the present example and may be, for example, a contactless power feeding apparatus including primary series-secondary series resonant capacitors (an SS configuration) or primary series-secondary parallel resonant capacitors (an SP configuration). In another example, the feeder 11 and the receiver 21 may be included in a contactless power feeding apparatus that uses no resonance in the power feeder but uses a parallel resonance between the receiver coil 41 and the resonant capacitor 42 in the power feeder (an NP configuration).

Figure 6:
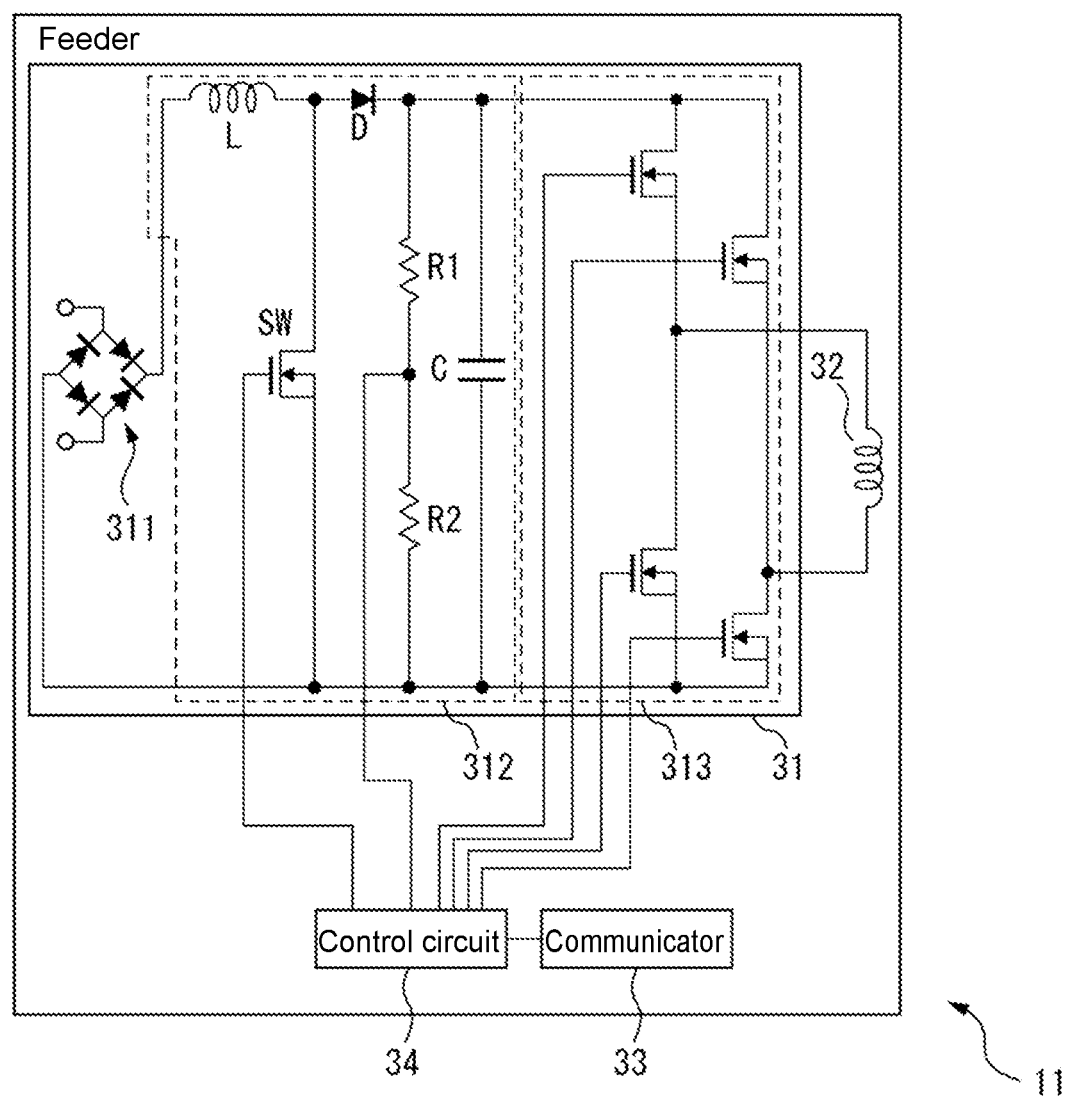
FIG. 6 is a diagram illustrating a schematic diagram of a feeder.

The feeder 11 included in the power feeding station 2 will now be described. FIG. 6 is a schematic diagram of the feeder 11. The feeder 11 includes a power supply circuit 31, the feeder coil 32, a communicator 33, and a control circuit 34.

The power supply circuit 31 supplies AC power with an adjustable frequency and an adjustable voltage to the feeder coil 32. The power supply circuit 31 includes a full-wave rectifying circuit 311 that converts the AC power supplied from a utility power source to pulsed current power, a power factor correction circuit 312, and an inverter circuit 313.

The full-wave rectifying circuit 311 is connected between the utility power source and the power factor correction circuit 312, and converts the AC power supplied from the utility power source to pulsed current power. The full-wave rectifying circuit 311 includes four bridge-connected diodes. The full-wave rectifying circuit 311 outputs pulsed current power to the power factor correction circuit 312.

The power factor correction circuit 312 is connected between the full-wave rectifying circuit 311 and the inverter circuit 313, and improves the power factor of the pulsed current power output from the full-wave rectifying circuit 311 to convert the pulsed current power to DC power with a boosted voltage. The power factor correction circuit 312 includes, for example, a coil L and a diode D connected in series in the described order from the positive electrode output terminal of the full-wave rectifying circuit 311, a switching element SW, which is an n-channel metal-oxide-semiconductor field-effect transistor (MOSFET) having a drain terminal connected between the coil L and the diode D and a source terminal connected to the negative electrode output terminal of the full-wave rectifying circuit 311, and a smoothing capacitor C connected in parallel to the switching element SW across the diode D. The switching element SW has a gate terminal connected to the control circuit 34. The power factor correction circuit 312 includes two resistors R1 and R2 connected in series between the positive electrode output terminal and the negative electrode output terminal of the full-wave rectifying circuit 311. The resistors R1 and R2 are connected in parallel to the smoothing capacitor C between the diode D and the smoothing capacitor C. The voltage across the resistors R1 and R2 is measured by the control circuit 34 as a voltage output from the diode D.

The control circuit 34 controls the on-off state of the switching element SW in accordance with the duty cycle indicated by the control circuit 34 to allow the waveform of the current output from the diode D to have the same waveform as the voltage of the pulsed current power supplied from the full-wave rectifying circuit 311. The power factor correction circuit 312 thus performs power factor correction. As the duty cycle in which the switching element SW is on is higher, the diode D outputs a higher voltage.

The power output from the diode D is smoothed by the smoothing capacitor C into DC power and is output to the inverter circuit 313.

The power factor correction circuit 312 is not limited to the above structure and may have another structure to output a voltage adjustable as controlled by the control circuit 34.

The inverter circuit 313 connected between the power factor correction circuit 312 and the feeder coil 32 converts the DC power supplied from the power factor correction circuit 312 to AC power with a predetermined frequency and supplies the AC power to the feeder coil 32. The inverter circuit 313 may be a full-bridge inverter with four switching elements (e.g., n-channel MOSFETs) forming a full-bridge connection. The inverter circuit 313 may be a half-bridge inverter with two switching elements forming a half-bridge connection. With the control circuit 34 controlling on-off switching of each switching element in accordance with the predetermined frequency, the inverter circuit 313 converts the DC power supplied from the power factor correction circuit 312 to AC power with a predetermined frequency. The predetermined frequency allows the feeder 11 and the receiver 21 to perform a constant voltage output operation and is determined in accordance with the degree of coupling between the feeder coil 32 and the receiver coil 41. The predetermined frequency is hereafter referred to as a constant voltage frequency for ease of explanation.

The power supply circuit 31 may further include, between the power factor correction circuit 312 and the inverter circuit 313, a DC-DC converter that increases or decreases the voltage of the DC power output from the power factor correction circuit 312. The power supply circuit 31 may include an AC-DC converter that converts AC power supplied from a utility AC power source to DC power, instead of the full-wave rectifying circuit 311 and the power factor correction circuit 312. The power supply circuit 31 may include a DC power source, such as a lithium-ion secondary battery or a lead-acid storage battery, to supply DC power and a DC-DC converter that increases or decreases the voltage of the DC power supplied from the DC power source, instead of the full-wave rectifying circuit 311 and the power factor correction circuit 312.

The feeder coil 32 transmits, through a space, AC power supplied from the power supply circuit 31 to the receiver coil 41 in the receiver 21. The feeder 11 may include a capacitor connected in series to the feeder coil 32 between the feeder coil 32 and the inverter circuit in the power supply circuit 31. The capacitor may be used to cut DC power or to form a resonant circuit that resonates with the feeder coil 32 at the frequency of the AC power supplied to the feeder coil 32.

The communicator 33 extracts, from every radio signal received from a communicator in the receiver 21, a signal indicating the power reception state of the receiver 21, and outputs the signal to the control circuit 34. The communicator 33 includes, for example, an antenna that receives a radio signal in accordance with a predetermined wireless communication standard and a communication circuit that demodulates the radio signal. The predetermined wireless communication standard is, for example, ISO/IEC 15693, ZigBee (registered trademark), or Bluetooth (registered trademark).

The control circuit 34 includes, for example, nonvolatile and volatile memory circuits, an arithmetic circuit, and an interface circuit for connection to another circuit.

Based on the signal received from the receiver 21 through the communicator 33 indicating the power reception state of the receiver 21, the control circuit 34 controls on-off switching of each switching element included in the inverter circuit 313 to allow the feeder 11 and the receiver 21 to perform a constant voltage output operation. More specifically, the control circuit 34 controls on-off switching of each switching element included in the inverter circuit 313 to cause the AC power supplied to the feeder coil 32 to have a constant voltage frequency. The control circuit 34 may control the on-off state of the switching element SW in the power factor correction circuit 312 to adjust the voltage of the DC power supplied to the inverter circuit 313 to retain a constant voltage of the power received by the receiver 21.

The control circuit 34 determines whether the two-wheeler 3 is at an appropriate parking position by referring to the constant voltage frequency. When determining that the parking position is inappropriate, the control circuit 34 causes the display 12 to display a message prompting movement of the two-wheeler 3 to an appropriate parking position.

The operation of the control circuit 34 will be described in detail later.

Figure 7:
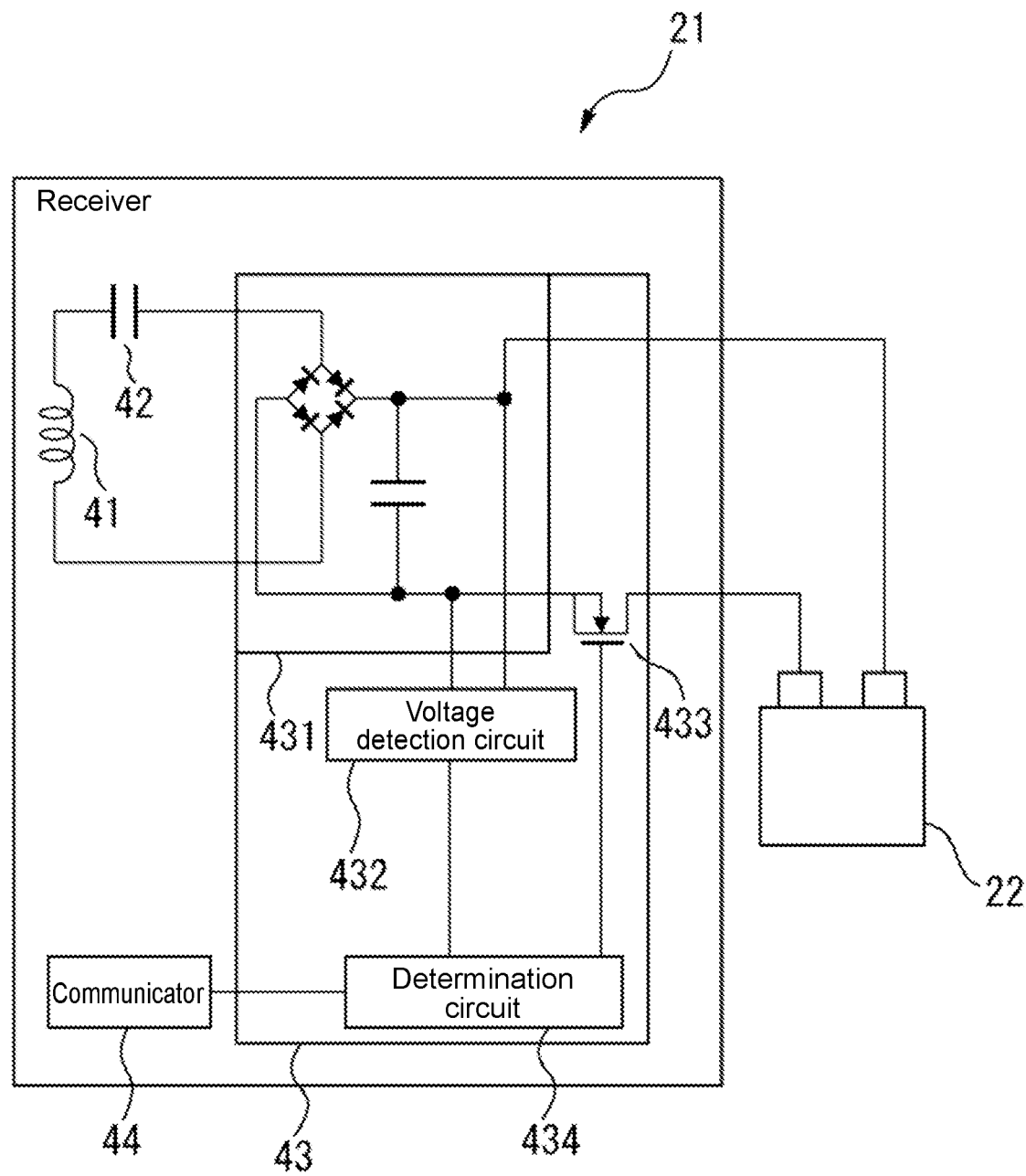
FIG. 7 is a diagram illustrating a schematic diagram of a receiver.

The receiver 21 included in the two-wheeler 3 will now be described. FIG. 7 is a schematic diagram of the receiver 21. The receiver 21 includes the receiver coil 41, a resonant capacitor 42, a power receiver circuit 43, and a communicator 44. The receiver coil 41 forms a resonant circuit with the resonant capacitor 42.

The receiver coil 41 forming the resonant circuit with the resonant capacitor 42 resonates with the AC flowing through the feeder coil 32 in the feeder 11 to receive power from the feeder coil 32. The resonant capacitor 42 is connected in series to the receiver coil 41. The resonant capacitor 42 may be connected in parallel to the receiver coil 41. The resonant circuit including the receiver coil 41 and the resonant capacitor 42 outputs AC power, which is output to the power receiver circuit 43. The receiver coil 41 and the feeder coil 32 may have the same number or different numbers of turns.

The power receiver circuit 43 converts the AC power from the resonant circuit including the receiver coil 41 and the resonant capacitor 42 to DC power. The DC power is output to the battery 22 that is connected to the power receiver circuit 43 through a power cable (not shown) and a charger (not shown) and is located above the rear wheel. The power receiver circuit 43 determines the state of power reception from the feeder 11, or more specifically, determines whether the output voltage from the power receiver circuit 43 is constant. The power receiver circuit 43 includes a rectifier-smoothing circuit 431, a voltage detection circuit 432, a switching element 433, and a determination circuit 434.

The rectifier-smoothing circuit 431, which is an example of a rectifier circuit, includes a full-wave rectifying circuit including four bridge-connected diodes or switching elements (e.g., MOSFETs), and a smoothing capacitor. The rectifier-smoothing circuit 431 rectifies and smooths the power received through the receiver coil 41 to convert the power to DC power. The rectifier-smoothing circuit 431 outputs the resultant DC power to the battery 22 through the charger.

The voltage detection circuit 432 measures an output voltage across the rectifier-smoothing circuit 431 (specifically, an output voltage from the power receiver circuit 43, hereafter simply referred to as an output voltage) at predetermined intervals. The output voltage across the rectifier-smoothing circuit 431 corresponds one-to-one to the output voltage from the resonant circuit including the receiver coil 41 and the resonant capacitor 42. The measurement value of the output voltage across the rectifier-smoothing circuit 431 thus indirectly represents the measurement value of the output voltage from the resonant circuit. The voltage detection circuit 432 may be any known voltage detection circuit that can detect, for example, a DC voltage. The voltage detection circuit 432 outputs a voltage detection signal representing the measurement value of the output voltage to the determination circuit 434.

The switching element 433 is, for example, a MOSFET and is connected between the rectifier-smoothing circuit 431 and the battery 22. The switching element 433 does not allow a current to flow from the rectifier-smoothing circuit 431 to the battery 22 in the off state (specifically, the AC equivalent resistance of the battery 22 and the charger Rac=∞) and allows a current to flow from the rectifier-smoothing circuit 431 to the battery 22 in the on state.

The determination circuit 434 determines, based on the measurement value of the output voltage received from the voltage detection circuit 432, whether the feeder 11 and the receiver 21 are performing a constant voltage output operation and whether the measurement value of the output voltage is within the range of allowable voltages. The determination circuit 434 provides the determination result to the communicator 44. The determination circuit 434 includes, for example, a memory circuit that stores the allowable range of voltages, an arithmetic circuit that compares the measurement value of the output voltage with the allowable range of voltages, and the control circuit that controls the on-off state of the switching element 433.

The determination circuit 434 turns on and off the switching element 433 at predetermined intervals while the measurement value of the output voltage is out of the allowable range of voltages, which changes the resistance of the entire circuit including the battery 22 connected to the rectifier-smoothing circuit 431 at predetermined intervals. The determination circuit 434 can thus determine whether the feeder 11 and the receiver 21 are performing a constant voltage output operation by determining whether the measurement value of the output voltage is substantially constant while turning on and off the switching element 433. The determination circuit 434 notifies the communicator 44 that the feeder 11 and the receiver 21 are performing a constant voltage output operation when the measurement value of the output voltage remains substantially constant while the switching element 433 is being turned on and off at predetermined intervals.

When the measurement value of the output voltage indicates that the feeder 11 and the receiver 21 are performing a constant voltage output operation for a predetermined period longer than the predetermined interval, the determination circuit 434 stops turning on and off the switching element 433 and retains the on state. The determination circuit 434 determines whether the measurement value of the output voltage is within the allowable range of voltages and provides the determination result to the communicator 44.

When the measurement value of the output voltage is within the allowable range of voltages for the predetermined period longer than the predetermined interval, the determination circuit 434 provides the communicator 44 with the determination result indicating that the feeder 11 and the receiver 21 are performing a constant voltage output operation and the measurement value of the output voltage is within the allowable range of voltages.

In one modification, the power receiver circuit 43 may include a resistor connected in parallel to the battery 22 to the rectifier-smoothing circuit 431. Accordingly, the switching element 433 may be connected in series to the resistor and in parallel to the battery 22. The determination circuit 434 turns off the switching element 433 while the measurement value of the output voltage is within the allowable range of voltages. When the measurement value of the output voltage is out of the allowable range of voltages, the determination circuit 434 may turn on and off the switching element 433 at predetermined intervals in the same manner as in the above embodiment. In the present modification, the battery 22 continuously receives power while the feeder 11 and the receiver 21 are not performing a constant voltage output operation.

In another modification, a second switching element, such as a MOSFET, may be connected in parallel to the above resistor and in series to the battery 22. Accordingly, while the measurement value of the output voltage is within the allowable range of voltages, the determination circuit 434 retains the on state of the second switching element to supply power to the battery 22. When the measurement value of the output voltage is out of the allowable range of voltages, the determination circuit 434 may turn off the second switching element to stop supplying power to the battery 22. The above described structure prevents an unexpectedly high voltage from being applied to the battery 22, although the voltage of received power rises unexpectedly during adjustment of the frequency of the AC power applied to the feeder coil 32 in the feeder 11.

The communicator 44 generates, at predetermined transmission intervals, a signal indicating the power reception state based on the determination result received from the determination circuit 434. The signal indicating the power reception state includes determination information indicating whether the feeder 11 and the receiver 21 are performing a constant voltage output operation and whether the measurement value of the output voltage is within the allowable range of voltages. The communicator 44 then generates a radio signal including the signal indicating the power reception state and transmits the radio signal to the communicator 33 in the feeder 11. The communicator 44 includes, for example, a communication circuit that generates a radio signal in accordance with a predetermined wireless communication standard and an antenna that outputs the radio signal. As in the communicator 33, the predetermined wireless communication standard is, for example, ISO/IEC 15693, ZigBee (registered trademark), or Bluetooth (registered trademark).

The operation of the control circuit 34 in the feeder 11 will be described in detail. A constant voltage output operation will be described first.

Figure 8:
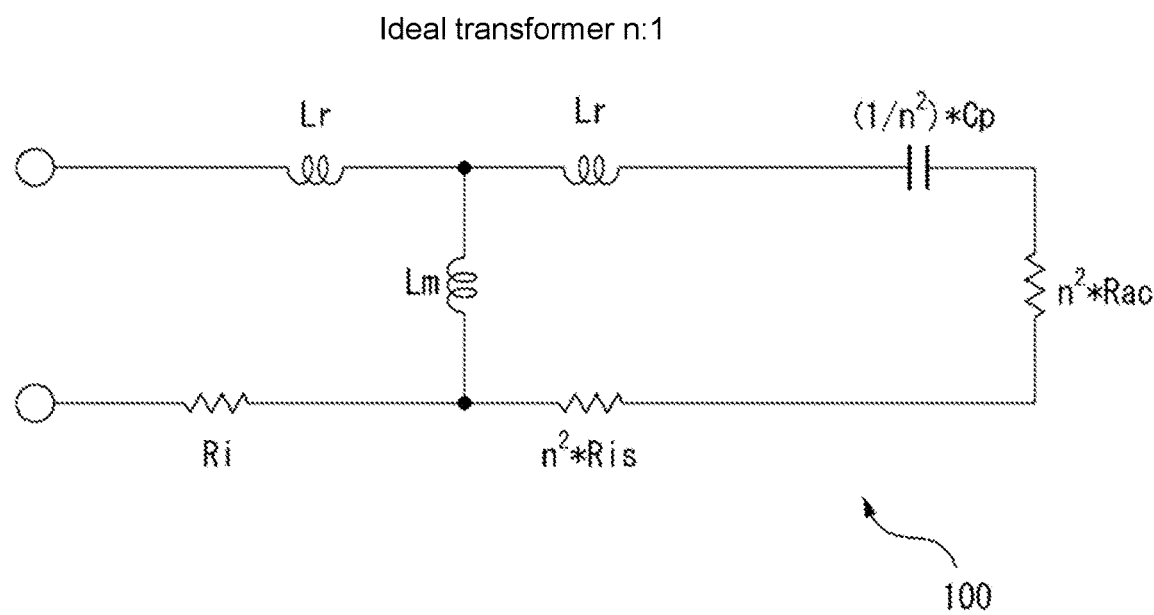
FIG. 8 is a diagram illustrating an equivalent circuit diagram of a feeder and a receiver.

FIG. 8 is an equivalent circuit diagram of the feeder 11 and the receiver 21. In an equivalent circuit 100, the feeder coil 32 is coupled with the receiver coil 41 to form an ideal transformer of n:1. In the equivalent circuit 100, Lr is the leakage inductance of the feeder coil 32, and Lm is the magnetizing inductance of the feeder coil 32. An inductance Lp of the feeder coil 32 is equal to (Lm+Lr), and Lr=(1−k) Lp and Lm=kLp, where k is the degree of coupling between the feeder coil 32 and the receiver coil 41. Ri is the coil resistance in the feeder 11, and Ris is the coil resistance in the receiver 21. Cp is the capacitance of the resonant capacitor 42 in the receiver 21. Rac is the AC equivalent resistance of a resistance Ro of the battery 22 and the charger, and Rac=(8/π2)×Ro.

Figure 9:
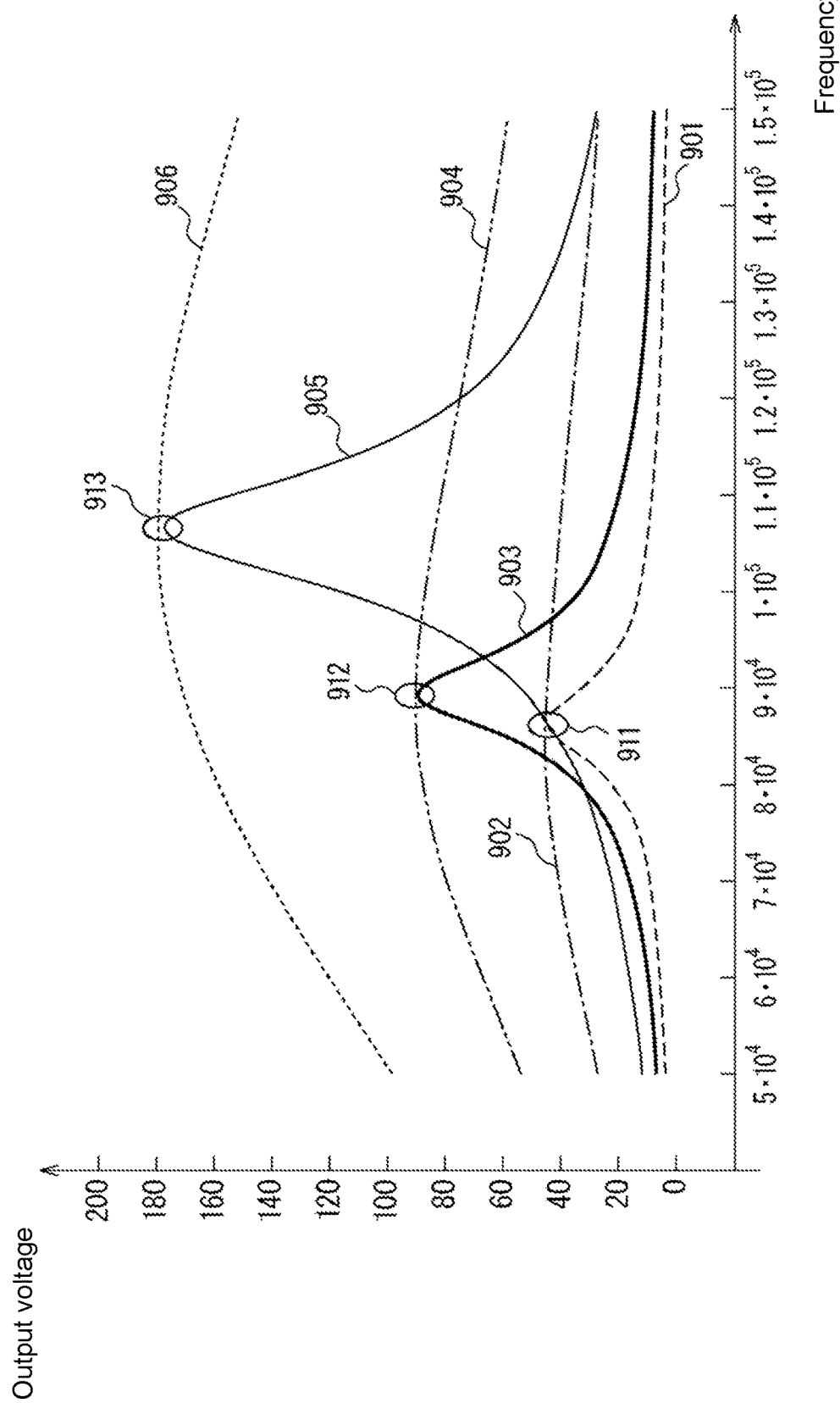
FIG. 9 is a graph illustrating example simulation results of a frequency response of an output voltage from a receiver.

FIG. 9 is a graph showing example simulation results of the frequency response of an output voltage from the receiver 21 calculated in accordance with the output gain from the equivalent circuit. In FIG. 9, the horizontal axis indicates the frequency of AC power applied to the feeder coil 32, and the vertical axis indicates an output voltage from the receiver 21. A line 901 represents the frequency response of an output voltage for the degree of coupling k=0.15, and the AC equivalent resistance of the battery 22 and the charger being Rac. A line 902 represents the frequency response of an output voltage for the degree of coupling k=0.15, and the AC equivalent resistance of the battery 22 and the charger being (10*Rac). A line 903 represents the frequency response of an output voltage for the degree of coupling k=0.3, and the AC equivalent resistance of the battery 22 and the charger being Rac. A line 904 represents the frequency response of an output voltage for the degree of coupling k=0.3, and the AC equivalent resistance of the battery 22 and the charger being (10*Rac). A line 905 represents the frequency response of an output voltage for the degree of coupling k=0.6, and the AC equivalent resistance of the battery 22 and the charger being Rac. A line 906 represents the frequency response of an output voltage for the degree of coupling k=0.6, and the AC equivalent resistance of the battery 22 and the charger being (10*Rac). In the simulation, Lp=174 pH, Cp=20 nF, Ri=Ris=0.1Ω, n=1, Vin=300 V, and Ro=10Ω(Rac 8.1Ω).

As indicated with the points 911 to 913 in FIG. 9, the graph includes, for each degree of coupling k, the combination of the frequency and the output voltage that causes an output voltage to be substantially constant against a varying AC equivalent resistance of the battery 22 under a constant degree of coupling k (or to be a constant voltage output under a constant degree of coupling k). Accordingly, it becomes apparent that appropriately adjusting the frequency of the AC power applied to the feeder coil 32 allows the feeder 11 and the receiver 21 to perform a constant voltage output operation independently of the varying resistance of the battery 22 and the charger. Further, although the output voltage, which is constant against a varying resistance of the battery 22 and the charger, differs depending on the degree of coupling as indicated at the points 911 to 913, adjusting the voltage applied to the feeder coil 32 can eliminate the difference in the output voltage. The output voltage thus can be substantially constant at any degree of coupling.

Figure 10:
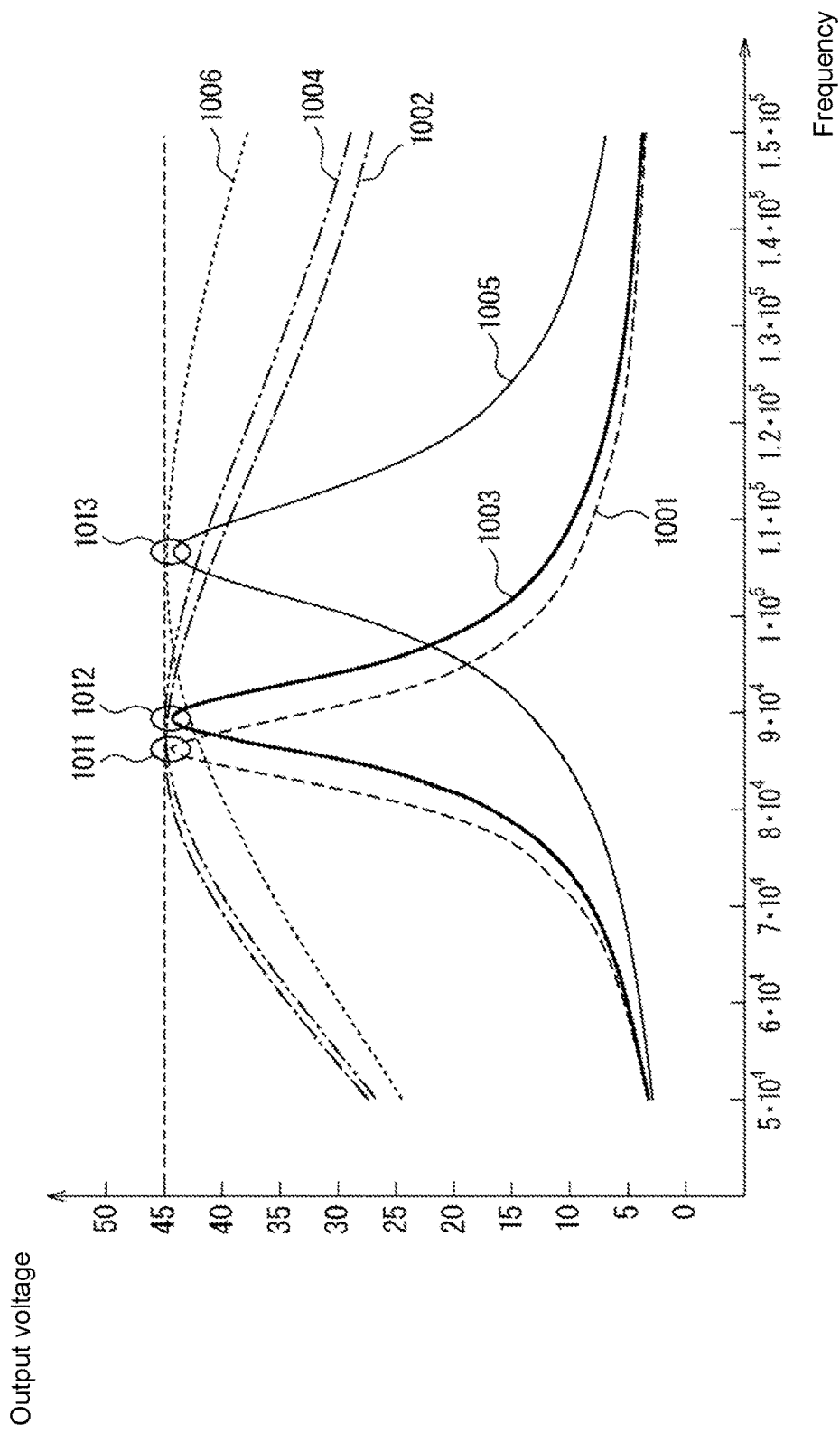
FIG. 10 is a graph illustrating example simulation results of a frequency response of an output voltage at varying voltages applied to a power feeder coil in accordance with a degree of coupling in a simulation, such as is shown in FIG. 9.

FIG. 10 is a graph showing example simulation results of the frequency response of an output voltage at varying voltages applied to the feeder coil 32 in accordance with the degree of coupling in the simulation shown in FIG. 9. In FIG. 10, the horizontal axis indicates the frequency of the AC power applied to the feeder coil 32, and the vertical axis indicates an output voltage from the receiver 21. A line 1001 represents the frequency response of an output voltage for the degree of coupling k=0.15, the AC equivalent resistance of the battery 22 and the charger being Rac, and a voltage applied to the feeder coil 32 being Vin. A line 1002 represents the frequency response of an output voltage for the degree of coupling k=0.15, the AC equivalent resistance of the battery 22 and the charger being (10*Rac), and a voltage applied to the feeder coil 32 being Vin. A line 1003 represents the frequency response of an output voltage for the degree of coupling k=0.3, the AC equivalent resistance of the battery 22 and the charger being Rac, and a voltage applied to the feeder coil 32 being (0.5*Vin). A line 1004 represents the frequency response of an output voltage for the degree of coupling k=0.3, the AC equivalent resistance of the battery 22 and the charger being (10*Rac), and a voltage applied to the feeder coil 32 being (0.5*Vin). A line 1005 represents the frequency response of an output voltage for the degree of coupling k=0.6, the AC equivalent resistance of the battery 22 and the charger being Rac, and a voltage applied to the feeder coil 32 being (0.25*Vin). A line 1006 represents the frequency response of an output voltage for the degree of coupling k=0.6, the AC equivalent resistance of the battery 22 and the charger being (10*Rac), and a voltage applied to the feeder coil 32 being (0.25*Vin).

The combinations of the frequency and the output voltage at three points 1011 to 1013 correspond to the combinations at the three points 911 to 913 shown in FIG. 9 that cause an output voltage to be substantially constant (or to be a constant voltage output) against a varying AC equivalent resistance of the battery 22 and the charger under the constant degree of coupling k. The output voltages at the points 1011 to 1013 are substantially equal to one another.

Accordingly, it becomes apparent that appropriately adjusting the frequency and the voltage of the AC power applied to the feeder coil 32 allows the output voltage to remain substantially constant independently of the varying resistance of the battery 22 and the charger or the varying degree of coupling.

The control circuit 34 thus controls the frequency of the AC power applied to the feeder coil 32 (hereafter, simply referred to as a frequency) and the voltage of the AC power applied to the feeder coil 32 in the manner described below to perform a constant voltage output operation.

When the determination information included in the signal indicating the power reception state received from the receiver 21 through the communicator 33 indicates that the feeder 11 and the receiver 21 are not performing a constant voltage output operation, the control circuit 34 increases the frequency from the lowest limit within a predetermined frequency range to the highest limit within the frequency range.

To allow the determination circuit 434 in the receiver 21 to determine whether the output voltage is substantially constant, the control circuit 34 may change the frequency in a stepwise manner to retain a constant frequency for a period longer than the interval at which the determination circuit 434 turns on and off the switching element 433.

The control circuit 34 may lower the voltage applied to the feeder coil 32 to the lowest value while adjusting the frequency. Lowering the voltage, while adjusting the frequency reduces the likelihood that power with an unexpectedly high voltage is supplied to the receiver 21.

When the determination information included in the signal indicating the power reception state received from the receiver 21 through the communicator 33 indicates that the measurement value of the output voltage is out of the allowable range of voltages but remains substantially constant against a varying resistance of the battery 22, or more specifically, a constant voltage output operation is being performed, the control circuit 34 subsequently retains a constant frequency. The control circuit 34 selects the duty cycle by referring to a reference table indicating the correspondence between each frequency and the duty cycle that controls the on-off state of the switching element SW in the power factor correction circuit 312 to perform a constant voltage output at the corresponding frequency at any degree of coupling. The control circuit 34 turns on and off the switching element SW in the power factor correction circuit 312 in accordance with the duty cycle. Thus, the voltage to be applied to the feeder coil 32 is adjusted to allow an output voltage from the receiver 21 to be within the allowable range of voltages, or more specifically, to allow a constant voltage to be output at any degree of coupling. When the determination information included in the signal indicating the power reception state received from the receiver 21 through the communicator 33 indicates that the measurement value of the output voltage is within the allowable range of voltages, the control circuit 34 retains a constant frequency and a constant voltage of AC power supplied to the feeder coil 32.

The control circuit 34 may gradually change the duty cycle until the determination information indicates that the measurement value of the output voltage is within the allowable range of voltages, instead of referring to the above reference table to select the duty cycle.

The control circuit 34 detects the frequency (constant voltage frequency) of the AC power applied to the feeder coil 32 that allows the feeder 11 and the receiver 21 to perform a constant voltage output operation and determines whether the parking position of the two-wheeler 3 is to be changed based on the frequency. Based on the determination result, the control circuit 34 provides a notification of guidance about the stop position of the two-wheeler 3 relative to the housing 10 through the display 12.

Referring back to FIG. 9, when the AC power applied to the feeder coil 32 has a constant voltage, the output voltage with the feeder 11 and the receiver 21 performing a constant voltage output operation varies depending on the degree of coupling between the feeder coil 32 and the receiver coil 41. More specifically, the output voltage increases as the degree of coupling between the feeder coil 32 and the receiver coil 41 increases. The power transmission efficiency thus increases as the degree of coupling increases. The degree of coupling between the feeder coil 32 and the receiver coil 41 changes in accordance with the positional relationship between the feeder coil 32 and the receiver coil 41. With the structure of the housing 10 in the power feeding station 2 in the present embodiment, the two-wheeler 3 parked at the power feeding station 2 moves to cause the receiver coil 41 to approach the front of the feeder coil 32. More specifically, when the two-wheeler 3 is parked, the distance between the feeder coil 32 and the receiver coil 41 changes in the direction parallel to the winding axis of the feeder coil 32, but the feeder coil 32 and the receiver coil 41 remain in mostly the same positional relationship in the direction orthogonal to the winding axis of the feeder coil 32. In the present embodiment, the distance between the feeder coil 32 and the receiver coil 41 is smaller when the two-wheeler 3 is nearer the housing 10, thus increasing the degree of coupling between the feeder coil 32 and the receiver coil 41.

The control circuit 34 thus compares the constant voltage frequency with a predetermined frequency threshold. As shown in FIG. 9, the feeder 11 and the receiver 21 in the present embodiment have higher power transmission efficiency when the constant voltage frequency is higher. The predetermined frequency threshold is thus set as a minimum constant voltage frequency with which the power transmission efficiency from the feeder 11 to the receiver 21 satisfies a predetermined power efficiency condition. When the constant voltage frequency is lower than the predetermined frequency threshold, the control circuit 34 determines that the feeder coil 32 is farther than intended from the receiver coil 41. The control circuit 34 then causes the display 12 to display a message prompting movement of the two-wheeler 3 further toward the power feeding station 2.

When the constant voltage frequency is higher than or equal to the predetermined frequency threshold, the control circuit 34 determines that the feeder coil 32 is sufficiently near the receiver coil 41 to achieve sufficiently high power transmission efficiency. The control circuit 34 then causes the display 12 to display a message prompting stopping of the two-wheeler 3 at the current position.

FIGS. 11A and 11B are diagrams each showing an example positional relationship between the feeder coil 32 in the power feeding station 2 and the receiver coil 41 in the two-wheeler 3 and an example message appearing on the display 12 in the positional relationship.

In the example shown in FIG. 11A, the receiver coil 41 is not sufficiently near the feeder coil 32. The constant voltage frequency is thus lower than the frequency threshold. The display 12 displays a message such as "Please move your vehicle a little forward." prompting movement of the two-wheeler 3 further toward the power feeding station 2.

In the example shown in FIG. 11B, the receiver coil 41 is sufficiently near the feeder coil 32. The constant voltage frequency is thus higher than or equal to the frequency threshold. The display 12 displays a message such as "Please park here." prompting stopping of the two-wheeler 3 at the current position.

As described above, the power feeding station includes the feeder for feeding power to a two-wheeler and transmits power to the two-wheeler through the feeder coil in the feeder and the receiver coil in the receiver included in the parked two-wheeler. The power feeding station detects the frequency of AC power supplied to the feeder coil that allows the feeder and the receiver to perform a constant voltage output operation and provides, based on the frequency, a notification to guide the two-wheeler to a position at which higher power transmission efficiency is achieved. The power feeding station thus can feed power contactlessly to the two-wheeler through the feeder coil and can also provide guidance about the parking position of the two-wheeler to increase the power transmission efficiency.

In one modification, the control circuit 34 in the feeder 11 may determine whether a parking position of a two-wheeler is appropriate based on the voltage of the AC power applied to the feeder coil 32 with which the receiver 21 outputs a constant voltage.

Referring back to FIGS. 9 and 10, each constant voltage frequency corresponds one-to-one to the voltage of the AC power applied to the feeder coil 32 to allow the receiver 21 to output a predetermined voltage. When the feeder coil 32 and the receiver coil 41 have a higher degree of coupling, the AC power applied to the feeder coil 32 is set to have a lower voltage. The control circuit 34 thus compares the voltage of the AC power applied to the feeder coil 32, which allows the receiver 21 to output the predetermined voltage when the feeder 11 and the receiver 21 are performing a constant voltage output operation, with a predetermined voltage threshold. When the voltage of the AC power applied to the feeder coil 32 is higher than the predetermined voltage threshold, the control circuit 34 causes the display 12 to display a message prompting movement of the two-wheeler 3 further toward the power feeding station 2. When the voltage of the AC power applied to the feeder coil 32 is lower than or equal to the predetermined voltage threshold, the control circuit 34 causes the display 12 to display a message prompting stopping of the two-wheeler 3 at the current position.

In the present modification, the power feeding station can feed power contactlessly to a two-wheeler through the feeder coil and can provide guidance about the parking position of the two-wheeler to increase the power transmission efficiency.

In another modification, the receiver coil 41 included in the receiver 21 in the two-wheeler 3 may be attached to the two-wheeler 3 with its winding axis extending in the lateral direction of the two-wheeler 3. For example, the receiver coil 41 may be installed lateral to the front wheel 23 of the two-wheeler 3 with its winding axis orthogonal to the surface of rotation of the front wheel 23 of the two-wheeler 3. Accordingly, the feeder coil 32 included in the feeder 11 in the power feeding station 2 may be installed to face the receiver coil 41 when the two-wheeler 3 is parked at an appropriate position for power transmission. For example, in the above embodiment, the feeder coil 32 may be installed in one of the pillars 13 or 14 in the housing 10 to be adjacent to the front wheel 23 of the parked two-wheeler 3. Accordingly, the feeder coil 32 is installed with its winding axis orthogonal to the surface of the pillar in the housing 10 that faces the front wheel 23 of the two-wheeler 3.

The above-described structure may cause insufficient power transmission efficiency when the two-wheeler 3 is parked to have its receiver coil 41 located beyond the feeder coil 32 or before the feeder coil 32. To place the receiver coil 41 near the feeder coil 32, the two-wheeler 3 is to be moved in a different direction depending on whether the receiver coil 41 is located beyond the feeder coil 32 or before the feeder coil 32.

In the present modification, the control circuit 34 records temporal changes in the constant voltage frequency in a memory included in the control circuit 34. The control circuit 34 then refers to the temporal changes in the constant voltage frequency to determine the direction in which the two-wheeler 3 is to be moved.

For example, the receiver coil 41 located beyond the feeder coil 32 passes a position nearest the feeder coil 32. The constant voltage frequency changes to be high and then to be low again. In contrast, the receiver coil 41 located before the feeder coil 32 does not reach the position nearest the feeder coil 32. Thus, the constant voltage frequency is not very high. The control circuit 34 causes the display 12 to display a message prompting movement of the two-wheeler 3 rearward from the power feeding station 2 when the temporal changes in the constant voltage frequency for a latest predetermined period include a maximum value that is higher than or equal to a predetermined frequency threshold and the current constant voltage frequency is lower than the frequency threshold. In contrast, the control circuit 34 causes the display 12 to display a message prompting movement of the two-wheeler 3 further toward the power feeding station 2 when the temporal changes in the constant voltage frequency for the latest predetermined period do not include reaching the predetermined frequency threshold or higher. When the current constant voltage frequency is higher than or equal to the frequency threshold, the control circuit 34 causes the display 12 to display a message prompting stopping of the two-wheeler 3 at the current position.

Similarly, the control circuit 34 may record, in a memory included in the control circuit 34, the temporal changes in the voltage of AC power applied to the feeder coil 32 that allows an output voltage from the receiver 21 to be a predetermined voltage while the feeder 11 and the receiver 21 are performing a constant voltage output operation. The control circuit 34 may thus determine the direction in which the two-wheeler 3 is to be moved by referring to the temporal changes in the voltage of the AC power. Accordingly, the control circuit 34 causes the display 12 to display a message prompting movement of the two-wheeler 3 rearward from the power feeding station 2 when the temporal changes in the voltage of the AC power for the latest predetermined period include a minimum voltage that is lower than or equal to a predetermined voltage threshold and the current voltage of the AC power is higher than the voltage threshold. In contrast, the control circuit 34 causes the display 12 to display a message prompting movement of the two-wheeler 3 further toward the power feeding station 2 when the temporal changes in the voltage of the AC power for the latest predetermined period do not include reaching the predetermined voltage threshold or lower. When the current voltage of the AC power is lower than or equal to the voltage threshold, the control circuit 34 causes the display 12 to display a message prompting stopping of the two-wheeler 3 at the current position.

In the present modification, the power feeding station can appropriately determine the direction in which the two-wheeler is to be moved relative to the power feeding station to increase the power transmission efficiency.

In the embodiment or the modifications described above, the power feeding station 2 may include one or more light sources instead of the display 12. Accordingly, the light source is another example of the notification source. The control circuit 34 changes the lighting state of the light source depending on whether the constant voltage frequency is lower than the predetermined frequency threshold or the constant voltage frequency is higher than or equal to the predetermined threshold. For example, when the constant voltage frequency is lower than the predetermined frequency threshold, the control circuit 34 may cause the light source to flash or to emit red light to prompt movement of the two-wheeler 3 further forward. When the constant voltage frequency is higher than or equal to the predetermined frequency threshold, the control circuit 34 may cause the light source to light continuously or to emit blue or green light to prompt parking of the two-wheeler 3 at the current position. In some embodiments, the power feeding station 2 may include a speaker instead of the display 12 or in addition to the display 12. The speaker is still another example of the notification source. The control circuit 34 may use a sound from the speaker to provide a notification of guidance about the parking position of the two-wheeler 3.

In still another modification, the display 12 may be installed on the two-wheeler 3. For example, the display 12 may be installed on the handle of the two-wheeler 3 to face upward. Accordingly, the control circuit 34 in the feeder 11 transmits a signal including a notification of guidance about the stop position of the two-wheeler 3 through the communicator 33 to the communicator 44 in the receiver 21 installed on the two-wheeler 3. Upon receiving the signal from the communicator 33, the communicator 44 outputs a notification of guidance about the stop position of the two-wheeler 3 included in the signal to the display 12. The display 12 may display the notification. The power feeding station 2 and the two-wheeler 3 may each include the display 12. The display 12 in the power feeding station 2 and the display 12 in the two-wheeler 3 may each output a notification of guidance about the stop position of the two-wheeler 3. Similarly to the above modification, instead of the display 12, or in addition to the display 12, the two-wheeler 3 may include a light source or a speaker. The light source or the speaker may output a notification of guidance about the stop position of the two-wheeler 3 included in the signal received through the communicator 44. The present modification also allows the power feeding station 2 to achieve the advantageous effects similar to the above embodiment.

In still another modification, the control circuit 34 in the feeder 11 may detect the constant voltage frequency by monitoring a current flowing through the feeder coil 32 as described in Japanese Unexamined Patent Application Publication No. 2018-207764. Accordingly, the feeder 11 includes a current detection circuit (not shown) that detects a current flowing through the feeder coil 32. The power receiver circuit 43 in the receiver 21 includes a constant load circuit (not shown). The constant load circuit provides a constant load connected to the resonant circuit including the receiver coil 41 and the resonant capacitor 42. The current detection circuit measures a current flowing through the feeder coil 32. The control circuit 34 may determine, as the constant voltage frequency, the frequency of the AC power applied to the feeder coil 32 and causing a maximum current to flow through the feeder coil 32.

In still another modification, the power feeding station may feed power to an object other than a two-wheeler. For example, the power feeding station may feed power to an electric scooter. The electric scooter is another example of an electric mobility vehicle. When the electric scooter is placed at the power feeding station with the receiver coil installed on the electric scooter approaching the feeder coil in a predetermined direction, the power feeding station can guide the electric scooter to a position at which higher power transmission efficiency is achieved as in the embodiments or the modifications described above.

As described above, those skilled in the art can make various changes in accordance with embodiments implemented within the scope of the present invention.

The invention claimed is:

1. A power feeding station for feeding power to a receiver comprising a receiver coil comprised in an electric mobility vehicle, the power feeding station comprising:

a feeder configured to feed power to the electric mobility vehicle through the receiver coil; and a housing defining a predetermined parking position of the electric mobility vehicle and accommodating the feeder, wherein the feeder comprises a feeder coil configured to feed power to the receiver through the receiver coil, a power supply circuit configured to supply alternating current power to the feeder coil, and a control circuit configured to control a frequency and a voltage of the alternating current power supplied to the feeder coil, and the control circuit:

determines whether a first parking position of the electric mobility vehicle relative to the housing is to be changed based on a detected value of the frequency of the alternating current power supplied to the feeder coil that allows the receiver to perform a constant voltage output operation, and based on the detected frequency, provides, through a notification source comprised in the power feeding station or in the electric mobility vehicle, a notification of guidance about a stop position of the electric mobility vehicle relative to the housing to increase power transmission efficiency from the feeder to the receiver in accordance with the detected frequency of the alternating current power with which the receiver outputs a constant voltage or in accordance with the voltage of the alternating current power with which the receiver outputs a constant and predetermined voltage.

2. The power feeding station according to claim 1, wherein the control circuit provides, through the notification source, the notification of guidance about the stop position of the electric mobility vehicle to allow the feeder coil and the receiver coil to be nearer each other when the alternating current power with which the receiver outputs a constant voltage has a frequency lower than a predetermined frequency threshold.

3. The power feeding station according to claim 1, wherein the control circuit provides, through the notification source, the notification of guidance about the stop position of the electric mobility vehicle to allow the feeder coil and the receiver coil to be nearer each other when the alternating current power with which the receiver outputs a constant and predetermined voltage has a higher voltage than a predetermined voltage threshold.

4. The power feeding station according to claim 1, wherein the control circuit records a temporal change in the frequency of the alternating current power with which the receiver outputs a constant voltage, determines, in accordance with the temporal change in the frequency, a direction in which the electric mobility vehicle is to be moved relative to the housing to increase power transmission efficiency from the feeder to the receiver, and provides, through the notification source, a notification to move the electric mobility vehicle in the direction.

5. The power feeding station according to claim 1, wherein the control circuit records a temporal change in the voltage of the alternating current power with which the receiver outputs a constant and predetermined voltage, determines, in accordance with the temporal change in the voltage, a direction in which the electric mobility vehicle is to be moved relative to the housing to increase power transmission efficiency from the feeder to the receiver, and provides, through the notification source, a notification to move the electric mobility vehicle in the direction.

\* \* \* \* \*